United States Patent [19]
Tarolli et al.

[11] Patent Number: 5,831,624
[45] Date of Patent: Nov. 3, 1998

[54] LEVEL OF DETAIL TEXTURE FILTERING WITH DITHERING AND MIPMAPS

[76] Inventors: Gary Tarolli, 788 Strawberry Hill Rd., Concord, Mass. 01742; Scott Sellers, 1495 Woodland Ave., Menlo Park, Calif. 94025; James E. Margeson, III, 1591 Santa Rosa Ct., Santa Clara, Calif. 95051

[21] Appl. No.: 640,450

[22] Filed: Apr. 30, 1996

[51] Int. Cl.$^6$ .................................................. G06T 11/40
[52] U.S. Cl. .......................................................... 345/430
[58] Field of Search ..................................... 395/118, 130, 395/125, 141, 139; 345/139, 418, 430, 425, 441, 439

[56] References Cited

U.S. PATENT DOCUMENTS

| | | | |
|---|---|---|---|
| 4,727,365 | 2/1988 | Bunker et al. | 345/139 |
| 5,548,709 | 8/1996 | Hannah et al. | 345/510 |
| 5,594,854 | 1/1997 | Baldwin et al. | 345/441 |
| 5,623,527 | 4/1997 | Scott | 377/72 |

OTHER PUBLICATIONS

Levoy et al., vol. Rendering in Radiation Treatment Planning, Visualization in Biomedical Computing, pp. 4–10, May 1990.

Chau et al., A Critical Analysis of Dithering Algorithms for Image Processing, IEEE Region 10 Conference on Computers and Communication, pp. 309–313, Sep. 1990.

*Primary Examiner*—Anton Fetting
*Attorney, Agent, or Firm*—Fenwick & West LLP

[57] ABSTRACT

A high quality texture filtering technique in a computer hardware system. The texture filtering quality of the present invention is comparable to trilinear filtering. However, the present invention reduces the number of memory accesses by fifty percent in comparison to trilinear filtering. To achieve this result, the present invention determines a pixel value based upon one or more texel values, e.g., four texel values, from only one of two mipmap levels. The mipmap level that is used is based upon the fractional portion of the LOD value and the position of the pixel. For a group of pixels having the same LOD value, the present invention performs a dithering operation that results in some pixel values being determined using texel values from the lower level mipmap and the remaining pixel values being determined using texel values from the higher level mipmap. The percentage of pixel values that are determined using texel values from the higher level mipmap is proportional to the fractional portion of the LOD value.

5 Claims, 10 Drawing Sheets

|  | | LOD FRACTION | | | |
|---|---|---|---|---|---|
|  |  | 00 | 01 | 10 | 11 |
| DITHER OUTPUT | 00 | L | L | L | L |
|  | 01 | L | L | L | H |
|  | 10 | L | L | H | H |
|  | 11 | L | H | H | H |

FIGURE 9

LEVEL OF DETAIL TEXTURE FILTERING WITH DITHERING AND MIPMAPS

CROSS-REFERENCE TO RELATED APPLICATIONS

The subject matter of this application is related to the subject matter of the following applications:

U.S. patent application Ser. No. 08/552,740, entitled "TEXTURE COMPOSITING APPARATUS AND METHOD", filed on 03 Nov. 1995, by Gary Tarolli, Scott Sellers, and James E. Margeson, III; and U.S. patent application Ser. No. 08/641,208, entitled "SYSTEM AND METHOD FOR NARROW CHANNEL COMPRESSION", filed on 30 Apr. 1996, by Gary Tarolli, Scott Sellers, James E. Margeson, III, and Murali Sundaresan;

U.S. patent application Ser. No. 08/640,070, entitled "SYSTEM AND METHOD FOR SELECTING A COLOR SPACE USING A NEURAL NETWORK", filed on 30 Apr. 1996, by Murali Sundaresan;

all of the above applications are incorporated by reference herein in their entirety.

all of the above applications are incorporated by reference herein in their entirety.

BACKGROUND OF THE INVENTION

1. Field of the Invention

The present invention relates generally to the field of image processing, and more particularly to determining pixel values based upon a display magnification value.

2. Description of Background Art

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Conventional graphic systems perform these graphic rendering procedures using a frame buffer. A frame buffer generally comprises a plurality of computer memory chips that store information concerning pixel activation on the system's display screen. Generally, the frame buffer includes all of the graphic information that will be written onto the screen.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object.

Many parameters have been texture mapped in conventional systems. Some of these parameters include surface color, specular reflection, normal vector perturbation, specularity, transparency, diffuse reflections, and shadows.

In texture mapping, a source image known as the "texture" is mapped onto a surface in three dimensional space. The three dimensional surface is then mapped to the destination image. The destination image is then displayed on a graphic display screen. Examples of the texture of an object include the gravel on a highway or scuff marks on a wooden surface.

A texture map comprises texture elements, i.e., "texels". Occasionally, when rendering an object using a texture map, one texel will correspond directly to a single pixel that is displayed on a monitor. In this situation the level of detail (LOD) is defined to be equal to zero (0) and the texel is neither magnified nor minified. However, the displayed image can be a magnified or minified representation of the object. If the object is magnified, multiple pixels will represent a single texel. A magnified object corresponds to a negative LOD value. If the object is minified, a single pixel represents multiple texels. A minified object corresponds to a positive LOD value. In general, the LOD value corresponds to the ratio of the texel pitch to the pixel pitch. When the object is minified, aliasing can occur in the displayed image because a single pixel represents multiple texels. Aliasing occurs because display screens comprise a finite number of pixels. For example, if a plurality of texels represent a smooth boundary between two different objects having significantly different colors and each pixel represents more than one texel, the boundary can appear jagged or discontinuous due to differences in the elevation of horizontally contiguous pixels or the differences in the position of vertically contiguous pixels. Texture filtering techniques can be used to reduce this aliasing effect.

A simple form of texture filtering is a "point sampling" filtering technique. When using the point sampling filtering technique, each pixel value is set equal to the value of the texel that is the closest to the pixel center. However, this technique does not reduce texture aliasing.

Other texture filtering techniques determine the texels that overlap each pixel and then compute a weighted average of these texels. Such filtering techniques are more accurate than the simple form of texture filtering described above, i.e., the texture aliasing effect is reduced. However, these other texture filtering techniques are more expensive in terms of memory accesses. More memory access require either more memory cycles, thereby reducing performance, or more memory pins, thereby increasing hardware costs.

Some texture filtering techniques reduce memory accesses by pre-computing filtered versions of the texture map and storing these pre-computed versions in memory. These pre-filtered versions of the texture map are called mipmaps. One technique for computing a set of mipmaps is to average each 2×2 block of texels in a texture map into one aggregate texel. This produces a mipmap twice as small in each dimension. This process is repeated until a 1×1 mipmap is produced. For example, a level 1 mipmap is a mipmap where each aggregate texel is the average of a 2×2 block of texels, a level 2 mipmap is a mipmap where each aggregate texel is the average of a 4×4 block of texels. A level "n" mipmap is a mipmap where each aggregate texel is the average of a $2^n \times 2^n$ block of texels.

Each mipmap level corresponds to a LOD value. For example, a level 1 mipmap corresponds to a LOD value of one, a level "n" mipmap corresponds to a LOD value of "n." If the LOD value is equal to an integer, e.g., 2, then the ratio of pixels to mipmap level 2 aggregate texels is 1:1. In this situation, the pixel values will be determined based upon aggregate texel values in the level 2 mipmap. Frequently, however, the LOD value is not equal to a mipmap level, i.e., the LOD value includes both an integer component and a non-zero fractional component. When the LOD value includes a non-zero fractional component, some texture filtering techniques include a procedure for determining the pixel value based upon the associated aggregate texel values located in the two nearest mipmaps, i.e., a lower level mipmap and a higher level mipmap.

A simple texture filtering technique that utilizes mipmaps equates each pixel value with the associated aggregate texel value in the mipmap that is most closely associated with the LOD value. For example, if the LOD value is equal to 2.25, each pixel will be set equal to the value of an associated aggregate texel in the level 2 mipmap. Similarly, if the LOD value is equal to 2.75, each pixel will be set equal to the value of an associated aggregate texel in the level 3 mipmap. One technique for determining the aggregate texel that is associated with a pixel is to select the aggregate texel whose center is the closest to the pixel center. Although this method is inexpensive to implement, only a moderate image quality is achieved because the LOD value is rounded to the nearest integer for all pixels and all pixel values are determined based upon the value of a single texel from the nearest mipmap level.

A higher image quality is achieved using a bilinear filtering technique. In bilinear filtering, a weighted average of four texels values (from a single mipmap level) that surround the pixel center is computed. FIG. 1 is an illustration of a 16 texel by 16 texel portion of a destination image 100. In this example, the LOD value is 1.585. As described in greater detail below, the number of texels per pixel is equal to $2^{(1.585)}=3.00$. The area represented by each pixel 120 is illustrated in FIG. 1 as a 3 texel by 3 texel block. Since the integer "2" is the closest integer to the LOD value, a level 2 mipmap is selected, and the texel values from the level 2 mipmap are used to determine the pixel values. Each aggregate texel 110 in the level 2 mipmap is the average of a 4×4 block of texels and is illustrated in FIG. 1 by a dashed line. FIG. 1 illustrates the relative position of texels and pixels when all texels represent a shape at a constant distance from a viewer. If the pixels of a shape are rendered using texels, and the shape represents an object that is at different distances from the viewer, e.g., a road that begins at the viewer and continues to the horizon, then the shape of the pixel will vary based upon this variation in distance and upon the viewing angle. When determining the value of a pixel, e.g., 120, using bilinear filtering, the values of the four aggregate texels that are the closest to the center of the pixel 120 are weighted based upon the distance from the center of each aggregate texel to the pixel center 120. The bilinear filtering technique utilized in the present invention is described below. Bilinear filtering is more accurate than the first technique described above and requires only four memory accesses if four texels are used to determine the pixel value. However, when using bilinear filtering the value of each pixel 120 that has the same LOD value is still based upon the aggregate texel values from a single mipmap level.

Trilinear filtering is a technique addressing the limitations of bilinear filtering. If the LOD value has a non-zero fractional portion, bilinear filtering is performed for both the lower level mipmap and the higher level mipmap. The pixel value is determined by calculating a weighted average of the two resulting values, i.e., one value for each mipmap level. The weight of each result is based upon the fractional portion of the LOD value. For example, if the LOD value is 1.585. A bilinear filtering technique will be performed for each pixel using both the level 1 mipmap and the level 2 mipmap. For each pixel, the value determined using the bilinear filtering technique with the level 1 mipmap will be combined with the value determined using the bilinear filtering technique using the level 2 mipmap. The weight of each of these two values is based upon the fractional portion of the LOD value, e.g., 0.585. Trilinear filtering is an accurate technique for determining pixel values. However, trilinear filtering requires eight memory accesses, i.e., four memory accesses for reading the four closest aggregate texel values in the lower level mipmap and four memory accesses for reading the four closest aggregate texel values in the higher level mipmap. These additional memory accesses, as compared to bilinear filtering, are undesirable.

What is needed is a texture filtering technique that determines pixel values more accurately than bilinear filtering, while not requiring the additional memory access expense of trilinear filtering.

SUMMARY OF THE INVENTION

The present invention is a system and method for associating a first pixel with one of a first mipmap and a second mipmap where the first pixel is associated with one of a first block of texels in the first mipmap and a second block of texels in the second mipmap. The second block has fewer texels than the first block. The first mipmap corresponds to a first detail level and the second mipmap corresponds to a second detail level, The method of the present invention includes receiving a first detail value for the first pixel where the first detail value represents a magnification level for the first pixel. The first detail value has a first portion and a second portion, where the value of the first portion is associated with the first detail level. The method of the present invention also includes the step of determining a first dither value based upon a position of the first pixel, and associating the first pixel with a first associated mipmap based upon the first dither value and the second portion of the first detail value, the first associated mipmap is one of the first mipmap and the second mipmap.

The present invention is a high quality texture filtering technique in a computer hardware system. The texture filtering quality of the present invention is comparable to trilinear filtering. However, the present invention reduces the number of memory accesses by fifty percent in comparison to trilinear filtering. To achieve this result, the present invention determines a pixel value based upon one or more texel values (e.g., four texel values) from only one of two mipmap levels. The mipmap level that is used is based upon the fractional portion of the LOD value and the position of the pixel. For a group of pixels having the same LOD value, the present invention performs a dithering operation that results in some pixel values being determined using texel values from the lower level mipmap and the remaining pixel values being determined using texel values from the higher level mipmap. The percentage of pixel values that are determined using texel values from the higher level mipmap is proportional to the fractional portion of the LOD value.

BRIEF DESCRIPTION OF THE DRAWINGS

FIG. 9 is an illustration of the mipmap level that will be used to determine the pixel value based upon the dither output and the fractional portion of the LOD value.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1:
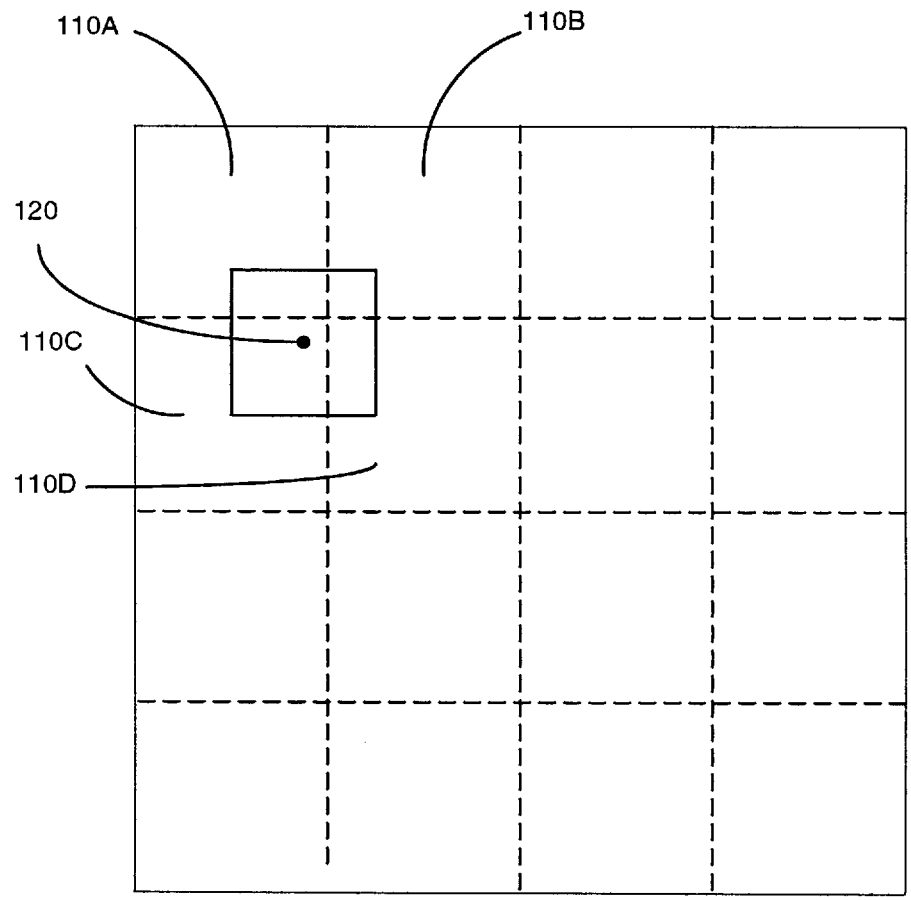
FIG. 1 is an illustration of a 16 texel by 16 texel portion of a destination image.
Figure 2:
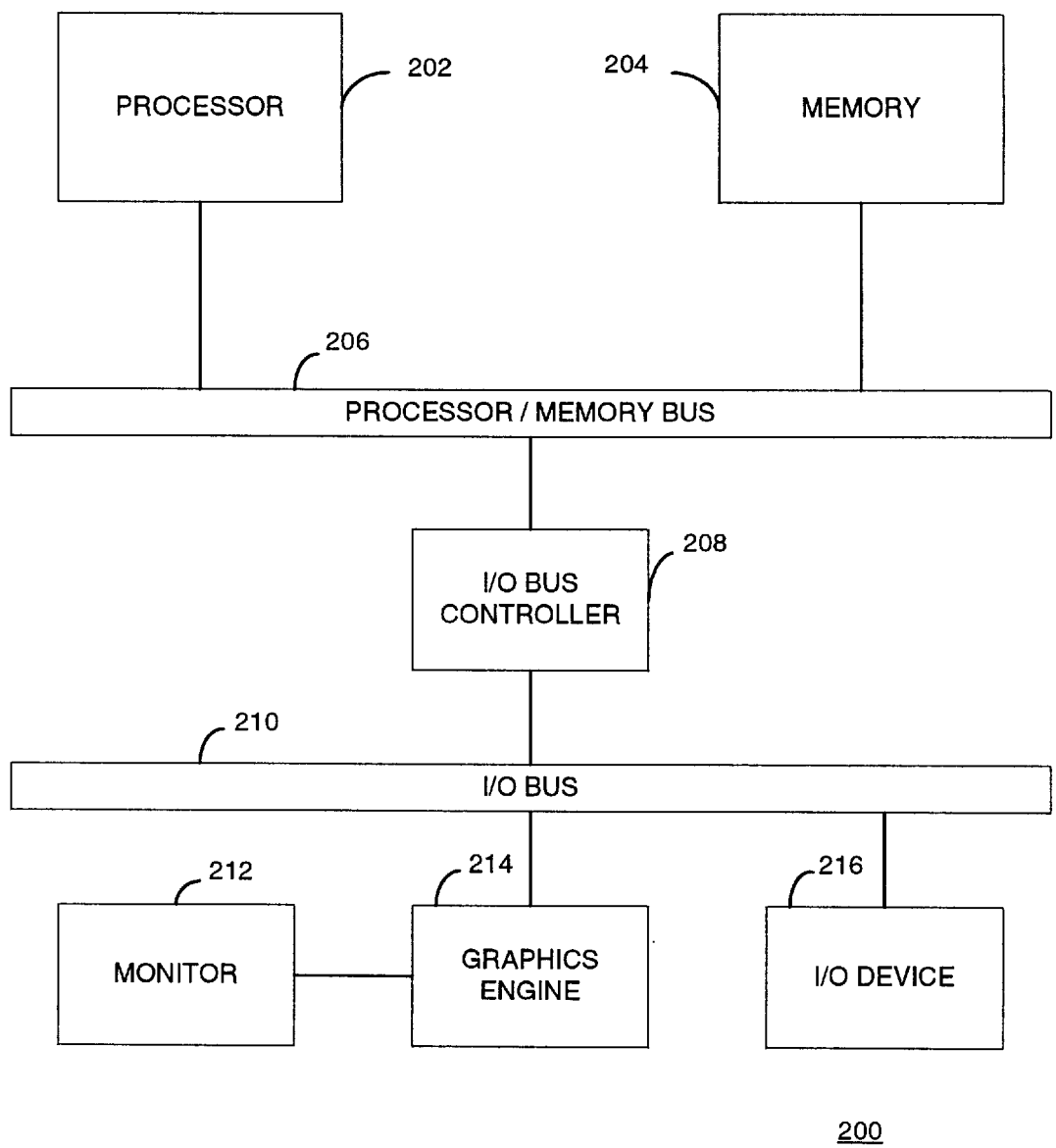
FIG. 2 is an illustration of a computer system in which the preferred embodiment of the present invention operates.

FIG. 2 is an illustration of a computer system 200 in which the preferred embodiment of the present invention operates. In the preferred embodiment, the computer system 200 is a conventional personal computer, e.g., an IBM compatible personal computer. In an alternate embodiment, the computer system is a video game platform, e.g., a Nintendo game platform, commercially available from Nintendo of America, Inc., Redmond, Wash. In the preferred embodiment, the processor 202 of the computer system 200 is a Pentium processor, commercially available from INTEL Corporation, Santa Clara, Calif. The memory 204 is conventional random access memory (RAM). The processor/memory bus 206 and the input/output (I/O) bus 210 are conventional. A conventional I/O bus controller 208 controls the data flow between the I/O bus 210 and the processor/memory bus 206. Conventional input/output devices 216, e.g., a keyboard, is connected to the I/O bus 210. A conventional computer monitor 212 is driven by a graphics engine unit 214. The graphics engine unit 214 is described in greater detail below with reference to FIGS. 3–9.

Figure 3:
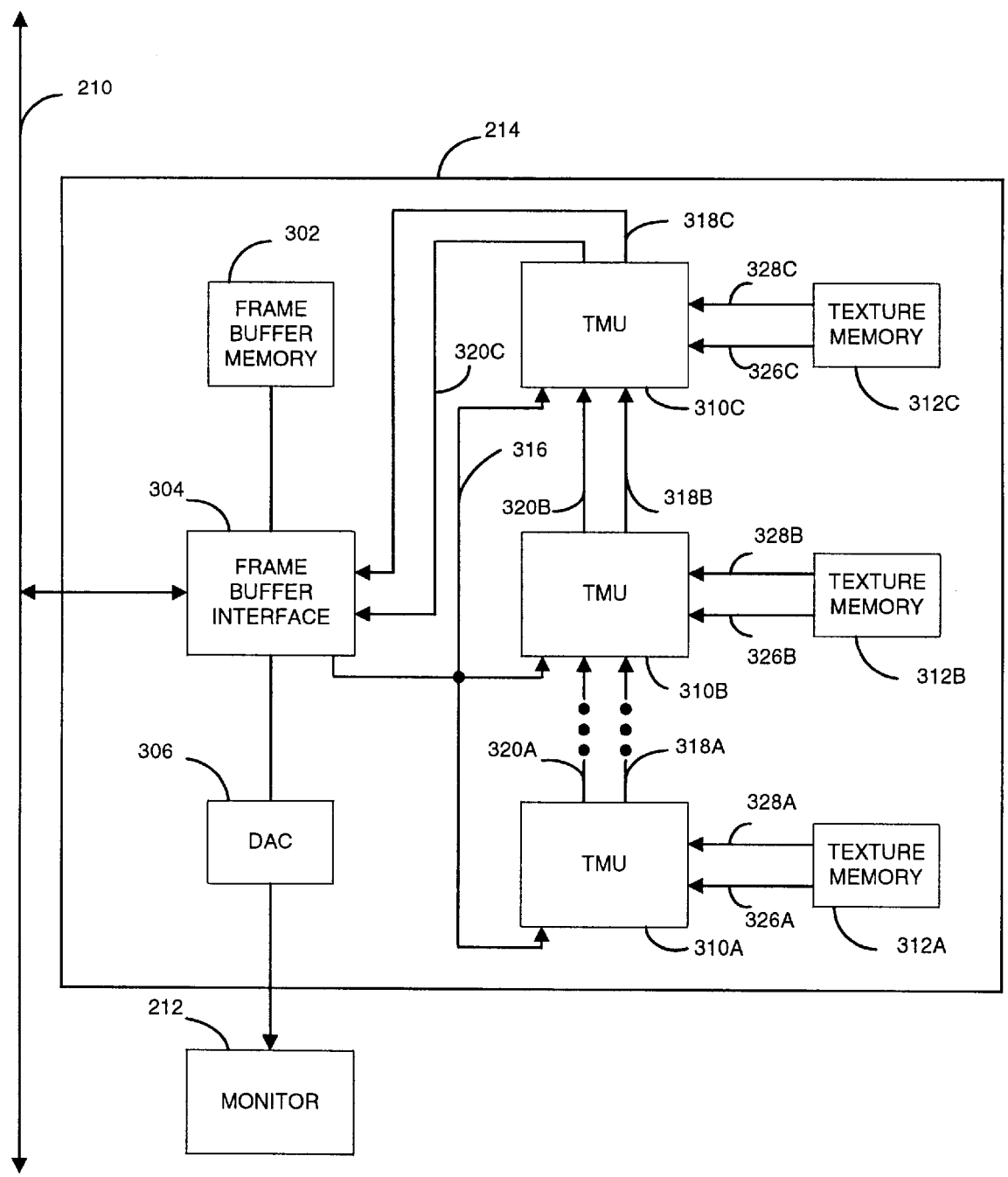
FIG. 3 is an illustration of the graphics engine of the preferred embodiment of the present invention.

FIG. 3 is an illustration of the graphics engine unit 214 of the present invention. The graphics engine unit 214 includes a frame buffer memory 302, a frame buffer interface (FBI) 304, a digital-to-analog converter (DAC) 306, one or more texture mapping units (TMU) 310, and texture memory 312. The FBI 304 is coupled to the I/O bus 210. The FBI 304 also is coupled to a frame buffer memory 302, a conventional DAC 306, and one or more TMUs 310. The DAC 306 is also coupled to the monitor 212. Each TMU 310 is also connected to the texture memory 312. The FBI 304 is an application specific integrated circuit (ASIC) that serves as an I/O slave device, and all communication from the processor 202 to the graphics engine 214 is performed through the FBI 304. The FBI 304 implements basic three dimensional primitives including Gouraud shading, depth buffering, and dithering. The FBI 304 also controls the output to the monitor 212. A more detailed description of the FBI 304 is set forth in pending U.S. patent application Ser. No. 08/552,740, attorney docket number 2199, entitled "TEXTURE COMPOSITING APPARATUS AND METHOD", filed on 03 Nov. 1995, by Gary Tarolli, Scott Sellers, and James E. Margeson, III that was incorporated by reference above.

The TMU 310 is also an ASIC. The TMU 310 performs composite texture mapping including texture morphing, and texture filtering. The operation of the TMU 310 is described in greater detail below with reference to FIGS. 3–9. Preferably, the frame buffer memory 302 and the texture memory 312 are extended-data-out (EDO) dynamic random access memory (DRAM). The TMU 310 receives a control signal CTRL from the FBI 304 via a control signal line 316. In addition, each TMU 310 receives a local texture color/alpha signal from its associated texture memory 312. The first local texture color signal line 326, and a local texture alpha signal line 328. In addition, each TMU 310, except the first TMU 310A when the system is designed without any feedback, receives a texture color/alpha input signal from a previous TMU 310. The texture color/alpha input signal is received via the input/output texture color signal line 318, and the input/output texture alpha signal line 320. For example, each TMU 310 generates a texture color/alpha output signal. This texture color/alpha output signal is transmitted on another input/output texture color line 318 and another input/output alpha texture color line 320. The texture color value generated by the TMU 310C that is the last in the chain of TMU's 310 is transmitted to the FBI 304. The TMU 310 is described in greater detail below with reference to FIGS. 4–9.

Figure 4:
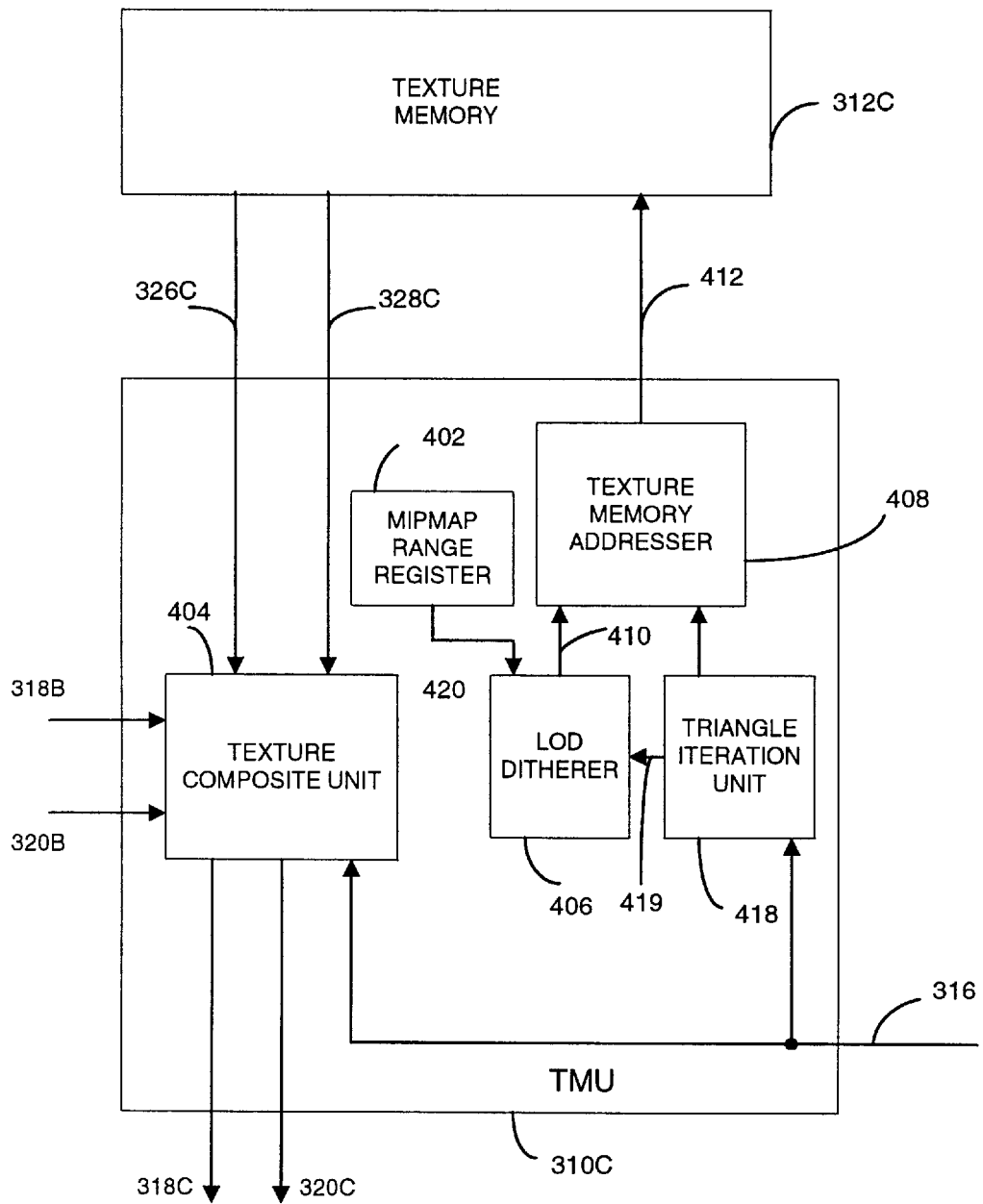
FIG. 4 is an illustration of a texture mapping unit and texture memory according to the preferred embodiment of the present invention.

FIG. 4 is an illustration of a TMU 310 and a texture memory unit 312 of the present invention. Each TMU 310 includes a texture composite unit (TCU) 404, a mipmap range register 402, a texture memory addresser 408, a level-of-detail (LOD) ditherer 406, and a triangle iteration unit 418. The mipmap range register 402 stores information relating to the lowest available mipmap level and the highest available mipmap level. As described below, this information will limit the range of the mipmap level selected by the LOD ditherer 406. The TCU 404 receives the CTRL signal via the control signal line 316. In addition, the TCU 404 receives a texture color input signal and a local texture color signal. The texture color input signal is comprised of a texture color input signal $C_{in}$ received on the input/output texture color signal line 318B and a texture alpha input signal $A_{in}$ received on the input/output texture alpha signal line 320B. The local texture color/alpha signal is comprised of a local texture color signal $C_{local}$ that is received on the local texture color signal line 326C and a local texture alpha signal $A_{local}$ that is received on the local texture alpha signal line 328C. As described above, the texture color/alpha input signal is the texture color/alpha output signal from a previous TMU 310. For the first TMU 310A, no texture color/alpha input signal is received. The local texture color/alpha signal is produced from a texture lookup in the texture memory 312.

The LOD Ditherer 406 receives the pixel coordinates for each pixel from a triangle iteration unit 418. The triangle iteration unit 418 is initialized and synchronized with other triangle iteration units located in other TMU's 310A, 310B, and in the Frame Buffer Interface 304 by a control signal received on control line 318. Once initialized and synchronized, the triangle iteration unit 418 renders objects using a shape, e.g., a triangle, in a predetermined manner. The triangle iteration unit 418 iterates through each pixel in an object and sends the pixel coordinates and the LOD value to the LOD ditherer. For each pixel, the LOD ditherer 406 determines the mipmap from which the pixel value is generated and transmits the mipmap level to the texture memory addresser 408. The LOD ditherer 406 is described in greater detail below with reference to FIGS. 5–9. The texture memory addresser 408 receives the mipmap level from the LOD ditherer 406 and a texel identification from the triangle iteration unit 418 and determines a mipmap address.

For each pixel, the texture memory addresser 408 transmits the mipmap address to the texture memory 312C via line 412 from which each pixel value is determined. Based upon the mipmap address, the texture memory transmits the local texture color signal $C_{local}$ on line 326 and a local texture alpha signal $A_{local}$ on line 328. In the preferred embodiment, four texture color signals and four texture alpha signals are sent to the TCU 404. Each combination of one texture color signal and one texture alpha signal requires one texture memory access. The result is a signal that is, preferably, in a 32 bit red-green-blue-alpha (RGBA) format having 8 bits allocated for each texture color component. The texture color/alpha input signal ($C_{in}$, $A_{in}$), the texture color/alpha output signal ($C_{out}$, $A_{out}$), and the local texture color/alpha signal ($C_{local}$, $A_{local}$) are all in the 32 bit RGBA format. Persons skilled in the relevant art will recognize that each texture color component can be represented by a different number of bits and that different and additional texture colors can be used. These signals represent the four aggregate texels to be used to determine the pixel value, as described below. The operation of the TCU 404 is described in greater detail in the pending U.S. patent application Ser. No. 08/552,740, entitled *Texture Compositing Apparatus and Method* filed on 03 Nov. 1995, that was incorporated by reference above.

A feature of the present invention is achieving high quality filtering in a computer hardware system. The quality of the present invention is comparable to trilinear filtering. However, the present invention reduces the number of memory accesses by fifty percent in comparison to trilinear filtering. To achieve this result, the present invention selects one or more texels, e.g., four texels, from only one of two mipmap levels for each pixel. However, for different pixels having the same LOD value, one or more texels from a different mipmap level may be selected. The mipmap selection is based upon the fractional portion of the LOD value and upon the position of the pixel. In alternate embodiments, the mipmap selection is based upon a random number, a pseudo-random number, or a counter. For a group of pixels, the present invention performs a dithering operation resulting in some pixel values being selected from the lower level mipmap and the remaining pixel values being selected from the higher level mipmap. The percentage of pixel values selected from the higher level mipmap is proportional to the fractional portion of the LOD value. If a rendered object contains only a single pixel, the value of the pixel will be determined using the same technique, i.e., the value of the pixel will be based upon values in either the lower level mipmap or the higher level mipmap. The mipmap level selection will be based upon the fractional portion of the LOD value and the pixel coordinates. The technique for determining the pixel values is described in greater detail below with reference to FIGS. 5–9.

Figure 5:
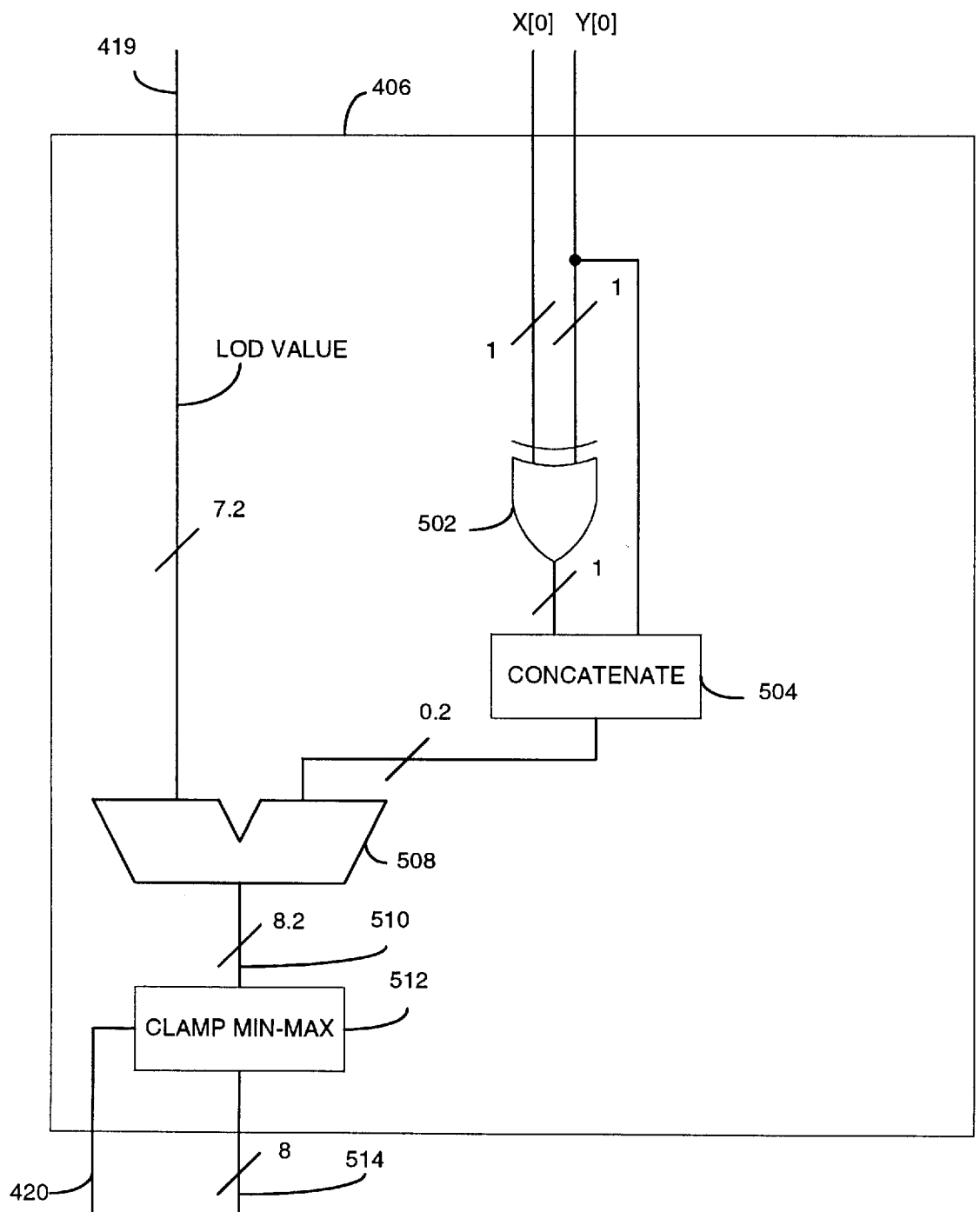
FIG. 5 is an illustration of the LOD Ditherer according to the preferred embodiment of the present invention.

FIG. 5 is an illustration of the LOD ditherer 406 according to the preferred embodiment of the present invention. The LOD ditherer 406 receives the LOD value and the pixel coordinates from the triangle iteration unit 418 via line 419, as described above. The LOD value is in a 7.2 format, i.e., the integer portion of the LOD value is seven bits in length and the fractional portion of the LOD value is two bits in length. The LOD ditherer 406 includes an exclusive-OR logic gate 502 that receives the least significant bit of the x-coordinate position of the pixel, x[0], and the least significant bit of the y-coordinate position of the pixel, y[0]. The LOD ditherer 406 includes a concatenate module 504 that receives two one-bit inputs and generates a single two-bit output. The LOD ditherer 406 also includes an adder 508 and a clamp 512. The operation of the LOD ditherer 406 is described below with reference to FIGS. 7–9.

Figure 7:
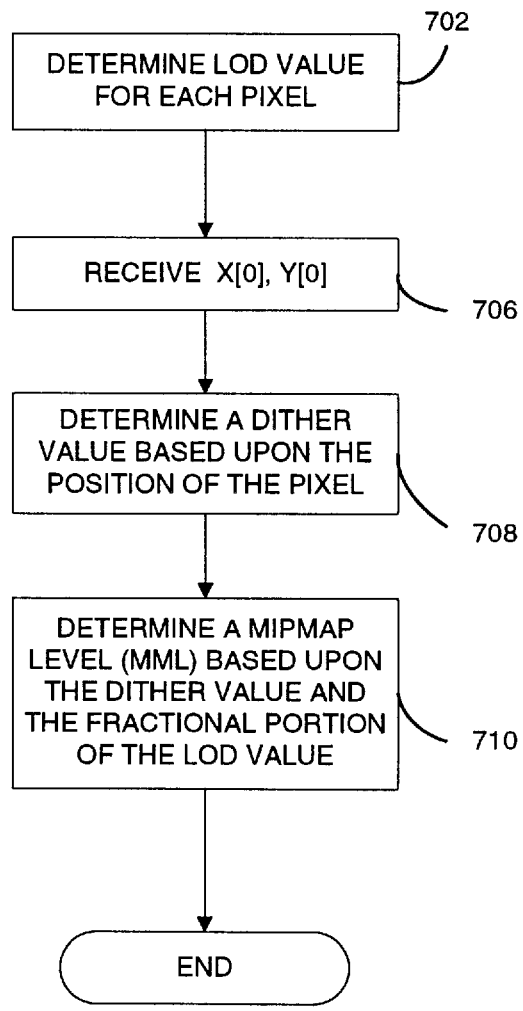
FIG. 7 is a flow chart of the operation of the LOD Ditherer according to the preferred embodiment of the present invention.
Figure 8A:
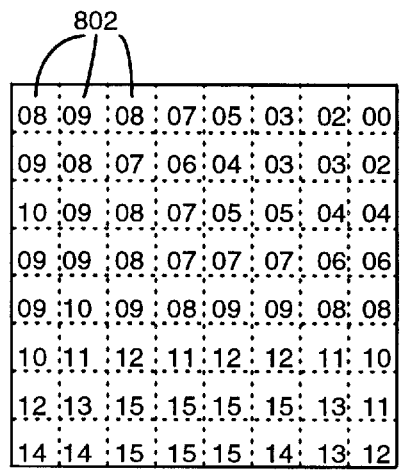
FIGS. 8A–D are an example of the LOD Dither filtering technique according to the present invention.
Figure 8B:
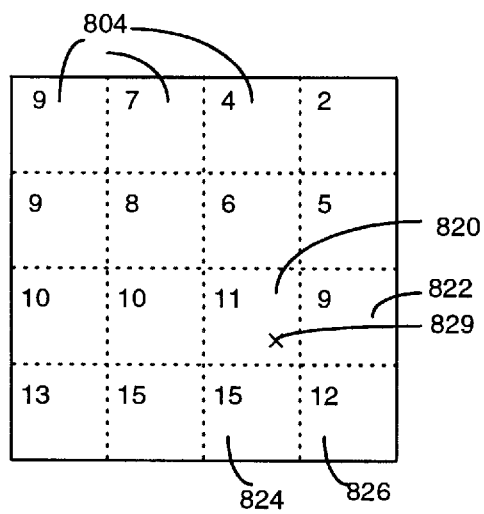

FIG. 7 is a flow chart of the operation of the LOD ditherer 406 according to the preferred embodiment of the present invention. FIG. 8 is an example of the LOD dither filtering technique according to the present invention. FIG. 8(a) illustrates an 8×8 block of texels 802. The numbers in each texel 802 represent a texel value for a particular color channel. In the preferred embodiment, each texel has four color channels. FIG. 8(a) corresponds to a mipmap level 0 texel map. FIG. 8(b) illustrates the same 8×8 block of texels shown in FIG. 8(a) corresponding to a mipmap level 1. Each aggregate texel 804 in mipmap level 1 is the combination of a 2×2 block of texels 802 and is bounded by dotted lines. Each aggregate texel 804 in mipmap level 1 has an associated value representing an average of an associated 2×2 block of texels in the next lowest mipmap level, i.e., mipmap level 0.

Figure 8C:
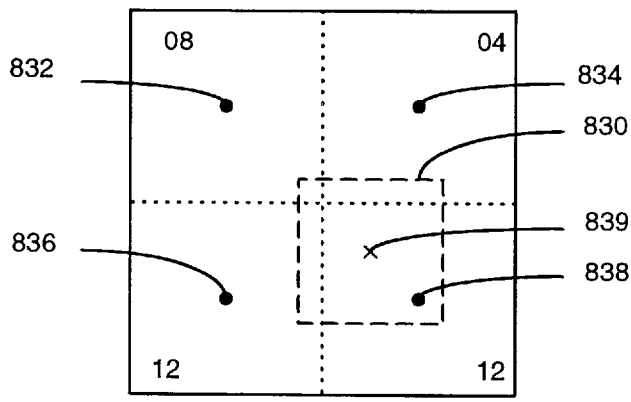

FIG. 8(c) illustrates the same 8×8 block of texels shown in FIG. 8(a). FIG. 8(c) corresponds to mipmap level 2. Each aggregate texel in mipmap level 2 is the combination of a 4×4 block of texels 802 and is bounded by dotted lines in FIG. 8(c). Each aggregate texel in mipmap level 2 has an associated value representing an average of an associated 2×2 block of texels in the next lowest mipmap level, i.e., mipmap level 1. FIG. 8C also illustrates a single pixel 830 having a center at the position identified by an "X" 839. The size of the pixel corresponds to the LOD and is based upon equation (1).

$$\text{(number of texels/pixel)} = 2^{(2 \cdot LOD)} \quad (1)$$

In this example, the LOD value is equal to 1.585. Therefore, each pixel 830 is equal to 9 texels, e.g., a 3×3 block of texels. As described above, the size of the pixel is equal to a 3×3 block of texels when pixel is part of a rendered object that is positioned perpendicular to the viewer, i.e., the distance from the viewer to the object is substantially constant. If the viewing angle is rotated or the distance changes the shape of the pixel changes. However, in the preferred embodiment, the techniques for determining the mipmap level and the pixel value are independent of the pixel shape, as described below.

The operation of the LOD ditherer 406 is now set forth. For each pixel the LOD ditherer 406 receives 702 the LOD value from the triangle iteration unit 418. In the preferred embodiment, the LOD value is based upon the ratio of the pixel pitch and the texel pitch, as described above. The LOD ditherer 406 also receives 706 the location of the pixel center from the triangle iteration unit 418 and determines the least significant bit of the x-coordinate, x[0], and the y-coordinate, y[0]. These least significant bits are received by logic that performs a dither function according to table (1).

TABLE (1)

| x[0] | y[0] | Dither Output |
|---|---|---|
| 0 | 0 | 00 |
| 0 | 1 | 11 |
| 1 | 0 | 10 |
| 1 | 1 | 01 |

Alternate dither functions can be used, including dither functions having a different number of inputs or outputs. The two-bit dither output can be equal to concatenation of the x[0] and y[0] values. However, the use of the dither function of table (1) results in an improved dither when compared to using the x[0] and y[0] values directly because, when using the dither function, a better mipmap level mix is achieved for adjacent pixels having the same LOD value.

With reference to FIG. 5, the preferred embodiment uses the exclusive-OR gate 502 and the concatenate module 504 to generate the dither output of table (1). Specifically, the least significant bit of the dither output is equal to y[0], therefore, y[0] is coupled directly to a first input of the concatenate module 504. The most significant bit of the dither output is equal to the exclusive-OR of x[0] and y[0]. Accordingly, x[0] and y[0] are received by the exclusive-OR gate 502. The output of the exclusive-OR gate 502 is received by a second input of the concatenate module 504. The output of the concatenate module 504 is a two-bit concatenation of its two input signals. The output of the concatenate module is received by a first input of adder 508. Adder 508 also receives the nine bit LOD value. As described above, the LOD value includes a 7-bit integer portion and a 2-bit fractional portion. The 2-bit fractional value is equal to the two most significant bits of the fractional portion of the LOD value. The adder 508 handles the 2-bit output of the concatenate module 504 as a fraction. The adder 508 adds the output of the concatenate module 504 and the fractional portion of the LOD value to generate a LOD dither output 510. The LOD ditherer 406 determines 710 the mipmap level based upon the LOD dither output. The LOD dither output is a ten bit number having an 8-bit integer portion and a 2-bit fractional portion. The LOD dither output 512 is clamped between the minimum and maximum mipmap levels as set forth in the mipmap range register 402. The clamping function truncates the fractional portion of the LOD dither output and clamps the integer portion between the minimum and maximum mipmap levels. The clamped LOD dither output on line 514 is equal to the mipmap level from which the value of the selected pixel will be determined.

FIG. 9 is an illustration of the mipmap level that will be used to determine the pixel value based upon the dither output and the LOD fractional portion. In FIG. 9, the possible values for the two-bit dither output are listed vertically, and the possible values for the two-bit LOD fractional portion are listed horizontally. The intersection of the dither output value and the LOD fractional value identifies which of the lower level mipmap (L) or the higher level mipmap (H) is to be selected. For example, when the 2-bit fractional portion of the LOD value is equal to "00", the lower level mipmap will always be used to determine the pixel values, i.e., when the LOD value is between 1.000 and 1.249, mipmap level 1 will always be chosen because the value of the dither output combined with "00" (the two most significant bits of the fractional portion of the LOD value) will not cause the integer portion of the clamped LOD dither output 514 to increase.

When the 2-bit fractional portion of the LOD value is equal to "01", the lower level mipmap will be selected for approximately 75 percent of the pixels. That is, only those pixels having a dither output equal to "11" will use values from the higher level mipmap to determine value of the pixel. As described above with respect to table (1), pixels whose position is x[0]=0 and y[0]=1 will have a dither output equal to "11". When the 2-bit fractional portion of the LOD value is equal to "10", the higher level mipmap will be selected for approximately 50 percent of the pixels. That is, only those pixels having a dither output equal to "11" or "10" will use values from the higher level mipmap to determine value of the pixel. When the 2-bit fractional portion of the LOD value is equal to "11", the lower level mipmap will be selected for approximately 25 percent of the pixels. That is, only those pixels having a dither output equal to "11", "10", or "01" will use values from the higher level mipmap to determine value of the pixels.

As described above, the LOD ditherer 406 transmits a signal to the texture memory addresser 408 for each pixel. The output signal represents the selected mipmap level. For each pixel, the texture memory addresser 408 transmits four addresses corresponding to the four texels in the determined mipmap level that are the closest to the pixel center. With reference to FIG. 8(b), if the LOD ditherer 406 determined that the mipmap level associated with a pixel, whose center is identified by an "X" 829, is mipmap level 1, then the texture memory addresser 408 transmits the address of texels 820, 822, 824, and 828 to the texture memory 312. The texture composite unit 404 receives the values of the texels from the texture memory 312 and performs bilinear filtering for the pixel using the four texel values from the selected mipmap. One bilinear filtering technique is described in detail below.

With reference to FIG. 8(c), if the LOD ditherer 406 determined that the mipmap level associated a pixel 830 is mipmap level 2, then the texture memory addresser 408 generates the address for texels 832, 834, 836, 838. The texture composite unit 404 then performs bilinear filtering for the pixel 830 using the four texel values from the selected mipmap.

Figure 8D:
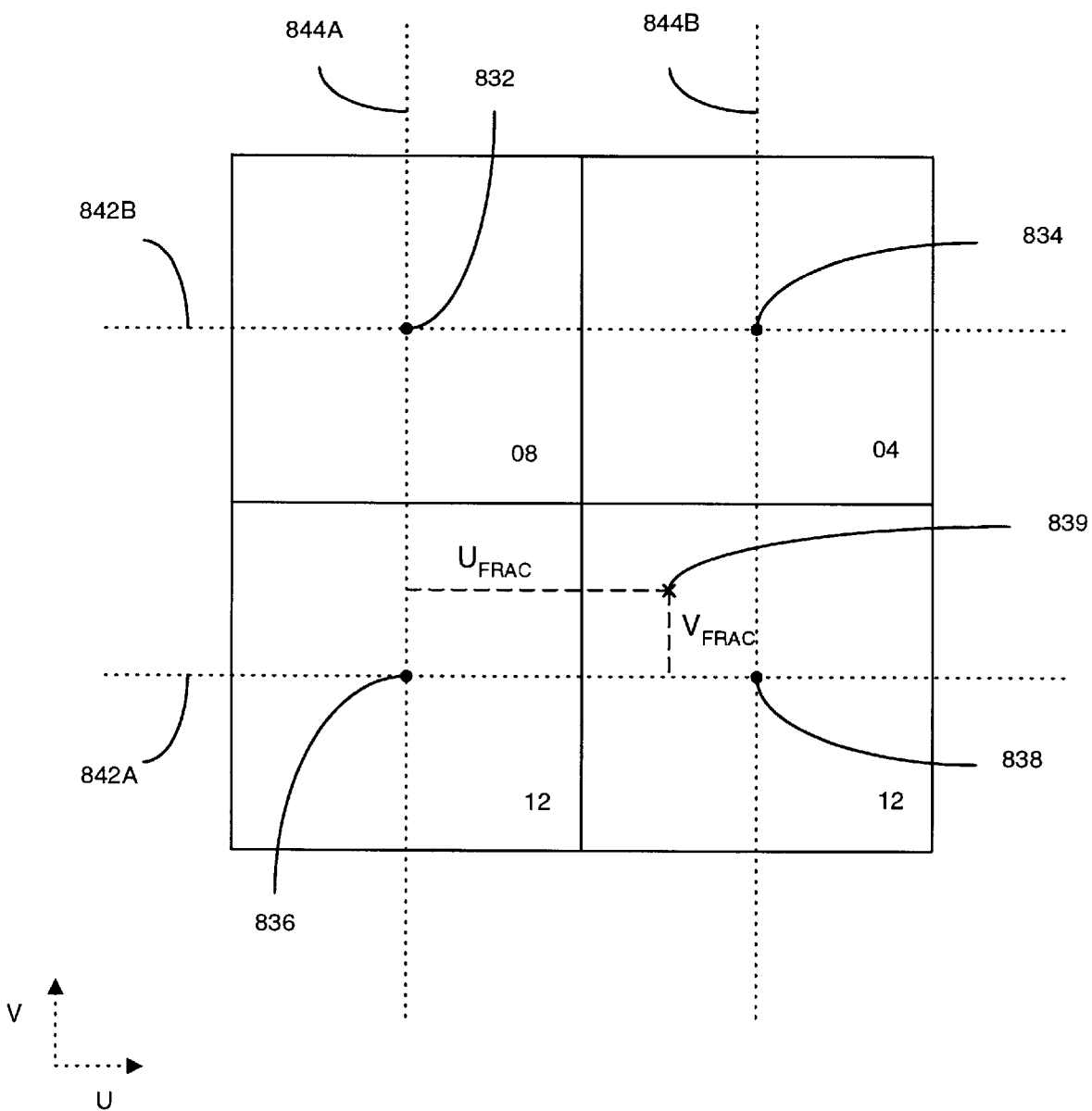

A bilinear filtering technique is now described with reference to FIG. 8D. As described above, for each pixel the TCU 404 receives four texel values representing four texels from the mipmap level determined by the LOD ditherer 406. The TCU also receives the coordinates of the pixel in the texel map for the mipmap level. The coordinates of the pixel are in the form of a "U" value and a "V" value, i.e., [U,V]. In FIG. 8D, the U axis is horizontal and the V axis is vertical. A horizontal line 842 connecting the texel centers in a particular row of texels corresponds to an integer value of V. A vertical line 844 connecting the texel centers in a particular column of texels corresponds to an integer value of U. In the example illustrated in FIG. 8D, the pixel center is identified with an "X" 839. The value of the pixel center includes an integer portion and a fractional portion for both U and V. That is, the pixel center can be represented as $[U_{INT}.U_{FRAC}, V_{INT}.V_{FRAC}]$. In the example, $U_{FRAC}$ is equal to 0.75 and $V_{FRAC}$ is equal to 0.25. The weight of each pixel is determined based upon the values of $U_{FRAC}$ and $V_{FRAC}$. Specifically, the weight of the texel centered at location 836 is equal to:

$$=(1-U_{FRAC})*(1-V_{FRAC})$$

$$=(1-0.75)(1-0.25)=0.1875$$

The weight of the texel centered at location 832 is equal to:

$$=(1-U_{FRAC})*(V_{FRAC})$$

$$=(1-0.75)(0.25)=0.0625$$

The weight of the texel centered at location 834 is equal to:

$$=(U_{FRAC})*(V_{FRAC})$$

$$=(0.75)(0.25)=0.1875$$

The weight of the texel centered at location 838 is equal to:

$$=(U_{FRAC})*(1-V_{FRAC})$$

$$=(0.75)(1-0.25)=0.5625$$

Based upon these weights, the value of a pixel centered at location 839 using mipmap level 2 is equal to the value of each texel in each color channel multiplied by the weight of the texel. Therefore, the value of one color channel of the pixel centered at location 839 is equal to:

$$(12)*(0.1875)+(13)*(0.0625)+(4)*(0.1875)+(12)*(0.5625) = 2.25+0.8125+0.75+6.75 = 10.5625$$

The present invention repeats the process for each pixel selected by the triangle iteration unit 418. The present invention is an inexpensive technique for improving the quality of an image. For a group of adjacent pixels, some pixel values will be determined using aggregate texels values from a lower level mipmap and other pixel values will be determined using aggregate texel values from a higher level mipmap. The percentage of pixels using aggregate texel values from the higher level mipmap is correlated to the fractional portion of the LOD value. For each individual pixel, the associated mipmap is determined based upon a dither value, which is based upon the position of the pixel, and the fractional portion of the LOD value.

The image quality is higher when using the present invention when compared to systems utilizing bilinear filtering, because the pixel values are not limited to a single mipmap for each LOD value. Instead, the pixel values are dithered such that adjacent pixels having the same LOD value may use aggregate texels values from different mipmap levels to determine their pixel values. In contrast, bilinear filtering utilizes only a single mipmap to determine all pixel values having the same LOD value and trilinear filtering requires twice as many memory accesses, e.g., eight memory accesses, to determine a pixel value.

In alternate embodiments of the present invention, the number of memory accesses used to determine each pixel value is reduced by lowering the number of adjacent texels in the selected mipmap that are used to determine the pixel value. For example, instead of using four adjacent texels to determine a pixel value, only two texels can be used. The benefits of the present invention over bilinear filtering and trilinear filtering are maintained even when a different number of texels are used to determine a pixel value. For example, traditional bilinear filtering techniques use only values from one mipmap level for all pixels, and traditional trilinear filtering will still use twice as many memory accesses because texels from two mipmap levels must be accessed for each pixel.

Figure 6:
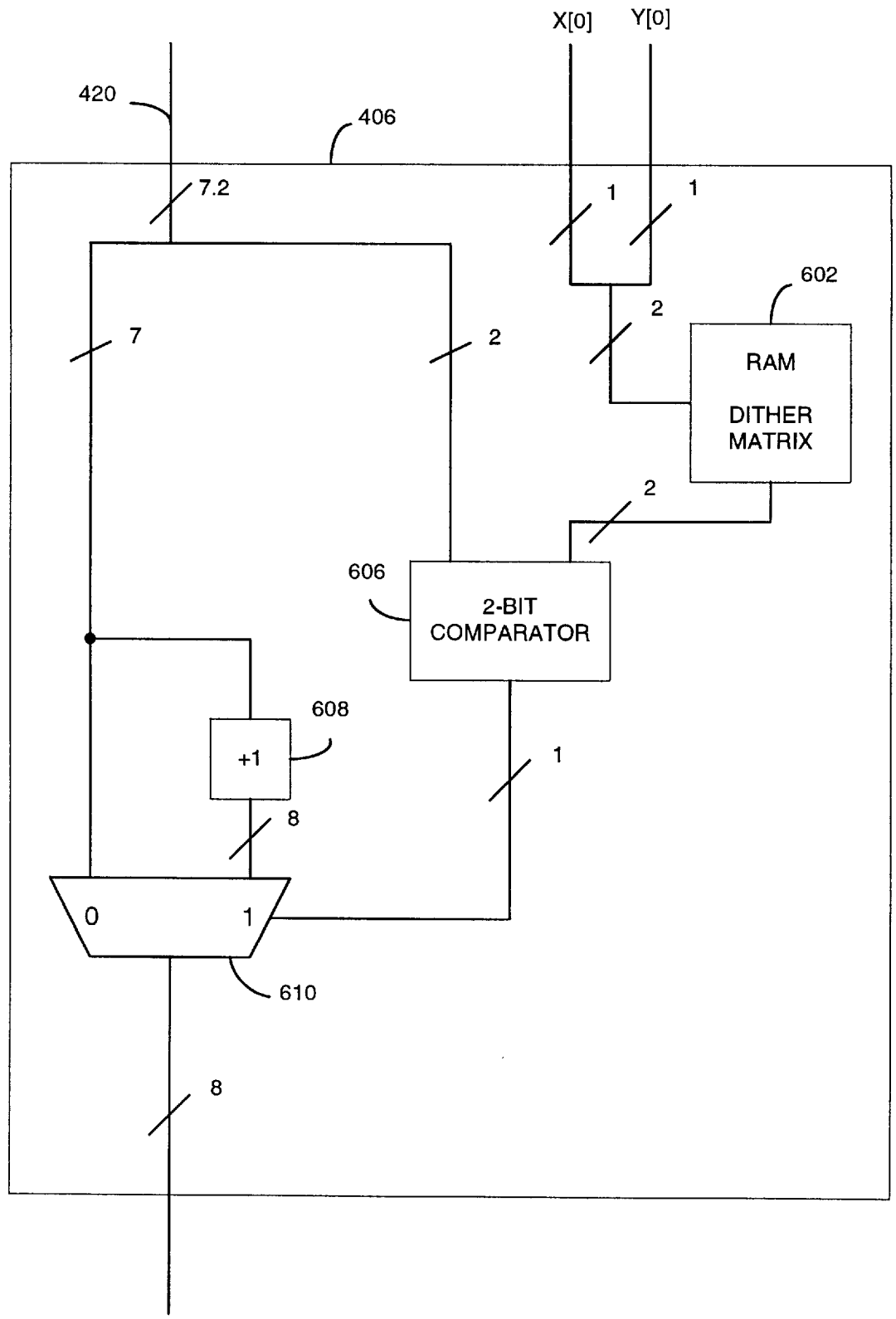
FIG. 6 is an illustration of the LOD Ditherer according to a second embodiment of the present invention.

FIG. 6 is an illustration of the LOD ditherer 406 according to a second embodiment of the present invention. The LOD ditherer 406 receives 702 the LOD value from the triangle iteration unit 418. The LOD value is a nine bit value in a 7.2 bit format. The LOD ditherer 406 separates the 7-bit integer portion from the 2-bit fractional portion. The LOD ditherer 406 also receives 706 the least significant bit of the x-coordinate position of each pixel, x[0], and the least significant bit of the y-coordinate position of each pixel, y[0], as described above. These bits are used to index a dither matrix located in a random access memory (RAM) module 602 (or a read-only memory module (ROM)) within the LOD ditherer 406. The dither matrix 602 generates 708 a dither value in accordance with table (1), as described above. A 2-bit comparator 606 compares the dither output with the fractional portion of the LOD value. If the fractional portion of the LOD value is greater than the dither output value, then the 2-bit comparator 606 generates a binary "1", otherwise the 2-bit comparator 606 generates a binary "0". The output of the 2-bit comparator is received at the address input of multiplexor (MUX) 610. If the signal on the address/control input of MUX 610 is a binary "0" then the MUX generates a signal equal to the integer portion of the LOD value. In this situation, the LOD ditherer 406 has determined 710 that the mipmap level is the lower of the two possible mipmap levels. If the signal on the address input of MUX 610 is a binary "1" then the MUX generates a signal equal to the output of the adder 608. The output of the adder 608 is equal to a value that is one greater than the integer portion of the LOD value. In this situation, the LOD ditherer 406 has determined 710 that the mipmap level is the higher of the two possible mipmap levels. The operation of the embodiment illustrated in FIG. 6 results in the same percentage of pixels having their values determined using aggregate texels from a lower level mipmap verses a higher level mipmap when compared to the preferred embodiment of the present invention, described above.

While the invention has been particularly shown and described with reference to a preferred embodiment, it will be understood by persons skilled in the relevant art that various change in form and details can be made therein without departing from the spirit and scope of the invention.

What is claimed is:

1. A method for associating a first pixel with one of a first mipmap and a second mipmap, the first pixel associated with one of a first block of texels in the first mipmap and a second block of texel in the second mipmap, the second block having fewer texels than the first block, the first mipmap corresponding to a first detail level, the second mipmap corresponding to a second detail level, the method comprising the steps of:

receiving first detail signal for the first pixel, said first detail signal representing a magnification level for the first pixel, said first detail signal having a first portion and a second portion, a value of said first portion is identified with the first detail level;

determining a first dither value; and selecting a first associated mipmap based upon said first dither value and said second portion of said first detail signal, said first associated mipmap is one of the first mipmap and the second mipmap having the steps of:

determining a first dithered level value by combining said first dither value and said second portion of said first detail signal;

selecting the first mipmap if said first dithered level value is less than a first value; and selecting the second mipmap if said first dithered level value is one of equal to said first value and greater than said first value.

2. The method of claim 1, wherein said dither value is a value less than one; and wherein said first value is equal to one.

3. A method for associating a first pixel with one of a first mipmap and a second mipmap, the first pixel associated with one of a first block of texels in the first mipmap and a second block of texels in the second mipmap, the second block having fewer texels than the first block, the first mipmap corresponding to a first detail level, the second mipmap corresponding to a second detail level, the method comprising the steps of:

receiving a first detail signal for the first pixels said first detail signal representing a magnification level for the first pixel, said first detail signal having a first portion and a second portion, a value of said first portion is identified with the first detail level;

determining a first dither value;

selecting a first associated mipmap based upon said first dither value and said second portion of said first detail signal, said first associated mipmap is one of the first mipmap and the second mipmap; and determining a value of the first pixel using at least one texel value in the first mipmap if said first mipmap is said associated mipmap and using at least one texel value in the second mipmap if said second mipmap is said associated mipmap having the steps of:

determining a value of a first texel and a value of a second texel from said associated mipmap;

determining a first weight factor for said first texel based upon the distance between a center of said first texel and a center of the first pixel;

determining a second weight factor for said second texel pixel based upon the distance between a center of said second texel and a center of the first pixel; and combining said first weight factor and said second weight factor to determine said value of the first pixel.

4. The method of claim 3, wherein the step of determining a value of the first pixel further comprises the steps of:

determining a value of a third texel and a value of a fourth texel from said associated mipmap;

determining a third weight factor for said third texel based upon the distance between a center of said third texel and a center of the first pixel;

determining a fourth weight factor for said fourth texel pixel based upon the distance between a center of said fourth texel and a center of the first pixel; and combining said first weight factor, said second weight factor, said third weight factor, and said fourth weight factor to determine said value of the first pixel.

5. A computer based system having a first mipmap having a first block of texels, a second mipmap having a second block of texels, second block of texels having fewer texels than said first block of texels and a first pixel having a pixel coordinate including first and second bits, the system comprising:

a detail receiving means for receiving a first detail signal for said first pixel, said first detail signal representing a magnification level for said first pixel, said first detail signal having a first portion signal and a second portion signal, a value of said first portion signal associated with said fist detail level; and a detail ditherer, disposed to receive said pixel coordinate and said second portion signal, for determining a first dither value based upon said pixel coordinate and for associating said first pixel with a first associated mipmap based upon said first dither value and said second portion signal of said first detail signal, said first associated mipmap is one of said first mipmap and said second mipmap, said detail ditherer includes:

a memory, disposed to receive said first bit and said second bit, having a plurality of dither values, for generating a first dither output equal to a first dither value of said plurality of dither values based upon the value of said first bit and said second bit;

a comparator, disposed to receive said first dither output and said second portion signal, for comparing said first dither output value and a value said second portion signal and for generating a comparison output representing a result of said comparison;

an adder, disposed to receive said first portion signal, for generating a first signal having value that is one greater than the first portion signal; and a multiplexer, having a first input disposed to receive said first portion signal, a second input disposed to receive said first signal, and a control input disposed to receive said comparison output, for generating said first dither value equal to one of said first portion signal and said first signal in response to said comparison signal.

* * * * *

UNITED STATES PATENT AND TRADEMARK OFFICE
CERTIFICATE OF CORRECTION

PATENT NO.    : 5,831,624

DATED         : November 3, 1998

INVENTOR(S)   : Gary Tarolli, Scott Sellers, and James E. Margeson, III

It is certified that error appears in the above-identified patent and that said Letters Patent is hereby corrected as shown below:

In claim 1, at column 12, line 29, replace "texel" with --texels--

In claim 1, at column 12, line 34, replace "receiving first" with --receiving a first--

In claim 3, at column 12, line 63, replace "pixels" with --pixel--.

Signed and Sealed this

Sixth Day of April, 1999

Attest:

Q. TODD DICKINSON

*Attesting Officer*      Acting Commissioner of Patents and Trademarks

UNITED STATES PATENT AND TRADEMARK OFFICE
CERTIFICATE OF CORRECTION

PATENT NO. : 5,831,624

DATED : November 3, 1998

INVENTOR(S) : Gary Tarolli, Scott Sellers, and James E. Margeson, III

It is certified that error appears in the above-identified patent and that said Letters Patent is hereby corrected as shown below:

Title page, before [21] insert --[73] Assignee: 3Dfx Interactive, Incorporated, San Jose, California Signed and Sealed this Thirty-first Day of August, 1999

Attest:

Q. TODD DICKINSON

*Attesting Officer*   *Acting Commissioner of Patents and Trademarks*